(12) United States Patent
Gu et al.

(10) Patent No.: US 11,942,893 B2
(45) Date of Patent: Mar. 26, 2024

(54) SYSTEMS AND METHODS FOR SPLIT-CELL AND MULTI-PANEL PHOTOVOLTAIC TRACKING CONTROL

(71) Applicant: Nextracker LLC, Fremont, CA (US)

(72) Inventors: Fei Gu, Fremont, CA (US); Yang Liu, Mountain View, CA (US); Venkata Rahul Abbaraju, Fremont, CA (US); Eric Martinez, Palo Alto, CA (US)

(73) Assignee: NEXTRACKER LLC, Fremont, CA (US)

( * ) Notice: Subject to any disclaimer, the term of this patent is extended or adjusted under 35 U.S.C. 154(b) by 954 days.

(21) Appl. No.: 16/805,798

(22) Filed: Mar. 1, 2020

(65) Prior Publication Data

US 2021/0273602 A1 Sep. 2, 2021

(51) Int. Cl.
*H02S 20/32* (2014.01)
*G05D 3/10* (2006.01)

(52) U.S. Cl.
CPC ............. *H02S 20/32* (2014.12); *G05D 3/105* (2013.01)

(58) Field of Classification Search
CPC ......... G05D 3/105; H02S 20/00; H02S 20/30; H02S 20/32
USPC ................................ 126/600, 601, 602, 603
See application file for complete search history.

(56) References Cited

U.S. PATENT DOCUMENTS

| | | | |
|---|---|---|---|
| 8,183,457 B2 | 5/2012 | Morgal | |
| 8,697,983 B2 | 4/2014 | Cashion et al. | |
| 9,837,556 B2 | 12/2017 | Jergovic et al. | |

FOREIGN PATENT DOCUMENTS

| | | |
|---|---|---|
| WO | 2017161358 A2 | 9/2017 |
| WO | 2019010387 A1 | 1/2019 |

OTHER PUBLICATIONS

Cheein et al., "Effective Backtracking Algorithms for Half-Cut Cell Solar Panels" 2019 Summer Undergraduate Research Program Symposium Poster, Cal Poly San Luis Obispo, published online Feb. 14, 2020.
Lorenzo et al., "Tracking and back-tracking", Progress in Photovoltaics, vol. 19, Issue 6, Sep. 2011, pp. 747-753, p. 2 Eq(4)-Eq(6)[online].
PCT Search report and written opinion issued in PCT/US2021/020250 dated May 21, 2021, 15 pages.
(Continued)

*Primary Examiner* — Vivek K Shirsat
(74) *Attorney, Agent, or Firm* — Fredrikson & Byron, P.A.

(57) ABSTRACT

Split-cell and multi-panel photovoltaic backtracking control systems and methods allow for increased total power generation during low sun elevation conditions by shading a percentage of panel modules, thereby allowing for a lower angle of incidence on unshaded modules. The control systems and methods involve determining a sun elevation angle, a traditional backtracking angle, a split-cell or multi-panel backtracking angle, a single-cell or single-panel relative light transmission (RLT) based on the single-cell or single-panel backtracking angle, and a split-cell or multi-panel RLT based on the split-cell or multi-panel backtracking angle. If twice the single-cell or single-panel RLT is greater than the split-cell or multi-panel RLT, the split-cell or multi-panel backtracking angle is used; otherwise, the single-cell or single-panel backtracking angle is used. The control systems and methods may further involve determining a diffuse fraction index (DFI) and, if the DFI is greater than a DFI limit, using a DFI tracking angle.

15 Claims, 4 Drawing Sheets

(56) References Cited

OTHER PUBLICATIONS

Schneider, "Control Algorithms for Large-scale Single-axis Photovoltaic Trackers", Acta Polytechnica vol. 52 No. Jun. 2012, p. 86-92, Published Jan. 5, 2012, p. 87 Sec 2.2.[online].
Martin, N. et al. "Calculation of the PV modules angular losses under field conditions by means of an analytical model," Solar Energy Materials & Solar Cells 70 (2001) 25-38.
Knisely, B. et al. "Validation of IEC 61853-2 standard (Draft): Angle of incidence effect on photovoltaic modules," published in the 2013 IEEE 39th Photovoltaic Specialists Conference (PVSC) (1621 Jun. 2013) spec p. 12.

SYSTEMS AND METHODS FOR SPLIT-CELL AND MULTI-PANEL PHOTOVOLTAIC TRACKING CONTROL

TECHNICAL FIELD

This disclosure is generally directed to single-axis solar tracking systems equipped with split-cell or multi-panel solar arrays. More specifically, this disclosure is directed to single-axis solar tracking systems capable of performing backtracking to allow for increased total power generation by intentionally shading a percentage of panel modules, thereby allowing for a lower angle of incidence on unshaded panel modules.

BACKGROUND

Motorized single-axis solar tracking systems often employ conventional backtracking algorithms to avoid inter-row shading by adjusting the tracking angle of the solar array platform towards horizontal during low sun elevation conditions. However, while solar tracking systems operating with conventional backtracking may reduce or eliminate inter-row shading, the resulting high angle of incidence of light upon the photovoltaic modules reduces the amount of power generated by the modules. Thus, these systems and methods have proven to be incompatible or inefficient for split-cell or multi-panel solar arrays.

SUMMARY

This disclosure is directed to single-axis photovoltaic tracking systems equipped with split-cell, multi-panel-in-portrait, and multi-panel-in-landscape photovoltaic arrays. More specifically, this disclosure is directed to a single-axis solar tracking system capable of performing backtracking to allow for increased total power generation by intentionally shading a percentage of panel modules, thereby allowing for a lower angle of incidence on unshaded modules.

Systems of this disclosure may include one or more computers configured to perform particular operations or actions of this disclosure by virtue of having software, firmware, hardware, or a combination of them installed on the systems that in operation cause or cause the systems to perform the operations or actions. In some aspects, one or more computer programs can be configured to perform particular operations or actions by virtue of including instructions that, when executed by a data processing apparatus, such as a microcontroller or a controller including a processor and a memory, cause the apparatus to perform the operations or actions. In one general aspect, this disclosure features a method of controlling a single-axis solar tracker.

The method includes determining a sun elevation angle and determining a single-cell or single panel solar array backtracking angle based on the sun elevation angle. The method also includes determining a split-cell or multi-panel solar array backtracking angle based on the sun elevation angle. The method also includes determining a first relative light transmission (RLT) based on the single-cell or single panel solar array backtracking angle. The method also includes determining a second RLT based on the split-cell or multi-panel solar array backtracking angle. The method also includes determining that the first RLT and the second RLT satisfy a predetermined relationship. The method also includes, in response to determining that the first RLT and the second RLT satisfy the predetermined relationship, controlling the single-axis solar tracker to rotate the solar array to the split-cell or multi-panel solar array backtracking angle. Other aspects include corresponding computer systems, apparatuses, and computer programs recorded on one or more computer storage devices, each configured to perform the operations or actions of the methods.

Implementations may include one or more of the following features. The method may include determining that the first RLT and the second RLT do not satisfy a predetermined relationship, and, in response to determining that the first RLT and the second RLT do not satisfy the predetermined relationship, controlling the single-axis solar tracker to rotate the solar array to the single-cell or single-panel solar array backtracking angle. The predetermined relationship may be that twice the first RLT is greater than the second RLT. The method may include determining a diffuse fraction index (DFI), determining that the DFI is greater than a DFI limit, and in response to determining that the DFI is greater than a DFI limit, controlling the single-axis solar tracker to rotate the solar array to the DFI backtracking angle instead of the split-cell or multi-panel backtracking angle.

Determining a single-cell or single panel solar array backtracking angle may include evaluating the following expression:

$$\theta_t = \theta_S - \cos^{-1}\left(\frac{\cos(\theta_S)}{GCR}\right),$$

where $\theta_S$ is the sun elevation angle relative to the horizon, $\theta_t$ is the backtracking angle relative to the zenith, and GCR is a ground coverage ratio. Determining a split-cell or multi-panel solar array backtracking angle may include evaluating the following expression:

$$\theta_t = 2\tan^{-1}\left(\frac{\tan(\theta_S) - \sqrt{1 - 4\left(\frac{1}{GCR}\right)^2 + \tan^2(\theta_S)}}{\frac{2}{GCR} + 1}\right)$$

where $\theta_S$ is the sun elevation angle relative to the horizon, $\theta_t$ is the backtracking angle relative to the zenith, and GCR is a ground coverage ratio.

Determining a split-cell or multi-panel solar array backtracking angle may include evaluating the following expression:

$$\theta_t = 2\tan^{-1}\left(\frac{-\left(\sqrt{(4\Delta h^2 + 4\Delta h + 1)\tan^2(\theta_S) - \frac{4}{GCR^2} + 1}\right) + (2\Delta h + 1)\tan(\theta_S)}{\frac{2}{GCR} + 1}\right)$$

where $\Delta h$ is a difference in height between adjacent solar tracker piers, $\theta_S$ is the sun elevation angle relative to the horizon, $\theta_t$ is the backtracking angle relative to the zenith, and GCR is a ground coverage ratio. The GCR is a span or width of the solar array divided by the pier-to-pier distance between rows of piers.

In another general aspect, this disclosure features a solar tracker system. The solar tracker system includes a first solar array including a first segment and a second segment. The first solar array is rotatably coupled to a first support pier and a first motor for driving the rotation of the first solar array.

The solar tracker system also includes a second solar array including a first segment and a second segment. The second solar array is rotatably coupled to a second support pier and a second motor for driving the rotation of the second solar array.

The solar tracker system also includes one or more controllers coupled to the first motor and the second motor. The one or more controllers determine a sun elevation angle; determine a single-cell or single panel solar array backtracking angle based on the sun elevation angle; determine a split-cell or multi-panel solar array backtracking angle based on the sun elevation angle; determine a first relative light transmission (RLT) based on the single-cell or single panel solar array backtracking angle; determine a second RLT based on the split-cell or multi-panel solar array backtracking angle; determine that the first RLT and the second RLT satisfy a predetermined relationship; and, in response to determining that the first RLT and the second RLT satisfy the predetermined relationship, control the first motor to rotate the first solar array to the split-cell or multi-panel solar array backtracking angle.

Implementations may include one or more of the following features. The one or more controllers may determine that the first RLT and the second RLT do not satisfy a predetermined relationship, and, in response to determining that the first RLT and the second RLT do not satisfy the predetermined relationship, control the first motor to rotate the first solar array to the single-cell or single-panel solar array backtracking angle. The predetermined relationship may be that twice the first RLT is greater than the second RLT. The one or more controllers may determine a diffuse fraction index (DFI), determine that the DFI is greater than a DFI limit, and in response to determining that the DFI is greater than a DFI limit, control the first motor to rotate the first solar array to a DFI tracking angle.

Determining a single-cell or single panel solar array backtracking angle may include evaluating the following expression:

$$\theta_t = \theta_S - \cos^{-1}\left(\frac{\cos(\theta_S)}{GCR}\right),$$

where $\theta_S$ is the sun elevation angle relative to the horizon, $\theta_t$ is the backtracking angle relative to the zenith, and GCR is a ground coverage ratio. Determining a split-cell or multi-panel solar array backtracking angle may include evaluating the following expression:

$$\theta_t = 2\tan^{-1}\left(\frac{\tan(\theta_S) - \sqrt{1 - 4\left(\frac{1}{GCR}\right)^2 + \tan^2(\theta_S)}}{\frac{2}{GCR} + 1}\right)$$

where $\theta_S$ is the sun elevation angle relative to the horizon, $\theta_t$ is the backtracking angle relative to the zenith, and GCR is a ground coverage ratio.

Determining a split-cell or multi-panel solar array backtracking angle may include evaluating the following expression:

$$\theta_t = 2\tan^{-1}\left(\frac{-\left(\sqrt{(4\Delta h^2 + 4\Delta h + 1)\tan^2(\theta_S) - \frac{4}{GCR^2} + 1}\right) + (2\Delta h + 1)\tan(\theta_S)}{\frac{2}{GCR} + 1}\right)$$

where $\Delta h$ is a height difference between the first support pier and the second support pier, $\theta_S$ is the sun elevation angle relative to the horizon, $\theta_t$ is the backtracking angle relative to the zenith, and GCR is a ground coverage ratio. The GCR may be the span of the first solar array divided by a distance between the first support pier and the second support pier. The first solar array may be a split-cell solar array, a multi-panel-in-landscape solar array, or a multi-panel-in-portrait solar array.

DETAILED DESCRIPTION

One aspect of the disclosure is directed to a single-axis solar tracking system for split-cell, multi-panel-in-landscape, or multi-panel-in-portrait solar arrays including a series of mechanically independent single-axis solar tracking platforms capable of performing backtracking in such a manner that allows for increased total power generation during low sun elevation conditions by intentionally shading a percentage of panel modules (e.g., those panel modules closest to the horizon), thereby allowing for a lower angle of incidence on unshaded module portions. Another aspect of the disclosure is directed to a mechanism for determining the power-optimal transition back to backtracking for single-cell or single panel (e.g., single-panel-in-portrait or single-panel-in-landscape) solar arrays. Individual tracking platforms may operate independently, may be self-powered, and may not require communications with other tracking platforms in the system. In other aspects, a wireless communication network and a system of supervisory control systems may be included.

Figure 1:
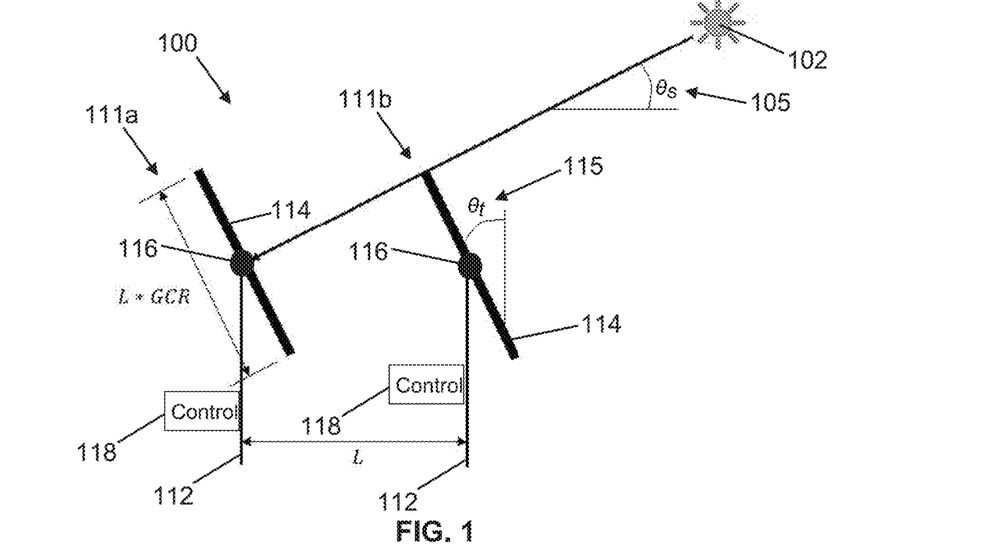
FIG. 1 is a block diagram illustrating the tracking angles and measurements pertaining to a single-cell or single-panel backtracking system.

FIG. 1 illustrates a backtracking system 100 for single-cell or single panel (e.g., single-panel-in-portrait or single-panel-in-landscape) solar array according to an aspect. The backtracking system 100 includes multiple rows of solar trackers 111a, 111b. Although two rows of solar trackers 111a, 111b are illustrated in FIG. 1, the backtracking system 100 may include more than two rows of solar trackers, e.g., 20 rows of solar trackers. Each row of solar tracker 111a, 111b includes piers 112 which support a single-cell or single-panel solar module 114. The solar modules 114 are rotatably coupled to the piers 112 and are mechanically driven by motors 116. Controllers 118 operate the motors 116 to drive the solar modules 114 to a desired angle.

Each of the controllers 118 may include a memory, which stores instructions for performing the methods described herein and operating the motors 116, a processor, which is coupled to the memory and executes the instructions, and a motor driver circuit, which is coupled to and controlled by the processor according to the executed instructions. The memory may include volatile and non-volatile memory. For example, the memory may include random access memory (RAM) and read-only memory (ROM). The processor may be an application specific integrated circuit (ASIC), a central processing unit (CPU), a microprocessor, or any other suitable circuit for performing the methods described herein and controlling the motor driver based on the instructions stored in memory.

As illustrated in FIG. 1, each row of solar trackers 111a, 111b may include a controller 118. In some aspects, there may be more than one controller 118 coupled to each row of solar trackers 111a, 111b. In aspects, the controllers 118 may include communications circuitry, such as wireless or wired communications circuitry. In the case where the controllers 118 include wired communications circuitry, the controllers 118 may connected to each via a communications line or cable. The communications line or cable may be integrated with a power cable that may connect to each row of solar trackers 111a, 111b. The backtracking system 100 may also include a supervisory controller (not shown). The supervisory controller may include wireless or wired communications circuitry configured to communicate with each of the controllers 118 so that the supervisory controller, which may implement a supervisory control system or form part of a system of supervisory control systems, can manage and/or coordinate operation of each row of solar trackers 111a, 111b. In some aspects, the supervisory controller may communicate with the controllers 118 via a wireless communications network.

Backtracking systems 100 for single-cell or single panel solar arrays operate by reducing the solar tracking angle 115 in accordance with the following relationship between the sun elevation angle 105 and the solar tracker angle 115:
where $\theta_s$ is the sun elevation angle 105 relative to the horizon, $\theta_t$ is the solar tracker angle 115 relative to the zenith, and GCR is the ground coverage ratio. The sun elevation angle 105 may be obtained from a sun position calculator, which may be implemented by software that determines the sun elevation angle 105 based on celestial trajectories, which may be stored in a database of a supervisory control system and accessed, as needed, by the controllers 118. The GCR may be expressed as the span or width (top to bottom) of the solar array divided by the pier-to-pier distance L between rows of support piers 112, assuming uniform spacing between rows of piers, as illustrated in FIG. 1.

Figure 2:
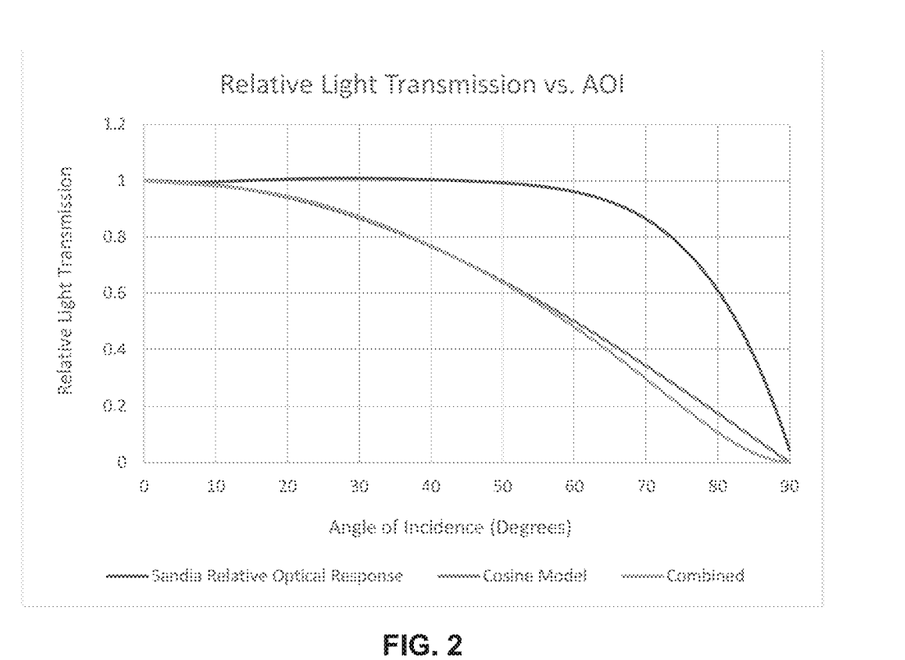
FIG. 2 depicts the power production to angle of incidence relationship for solar tracking systems according to an aspect of the disclosure.

The backtracking systems of the disclosure provide backtracking that result in shading avoidance between rows during low sun elevation angle 105 conditions. They also result in a low angle of incidence upon all solar modules 114 in the tracking system 100. As demonstrated in FIG. 2, as the angle of incidence on the solar modules 114 increases, the relative light transmission decreases considerably after 30 degrees. Considering the drastic reduction in photovoltaic output power associated with a high angle of incidence of the sun 102 on the solar modules 114, it is desirable to reduce the angle of incidence of the sun 102 on the solar modules 114 during backtracking.

Figure 3:
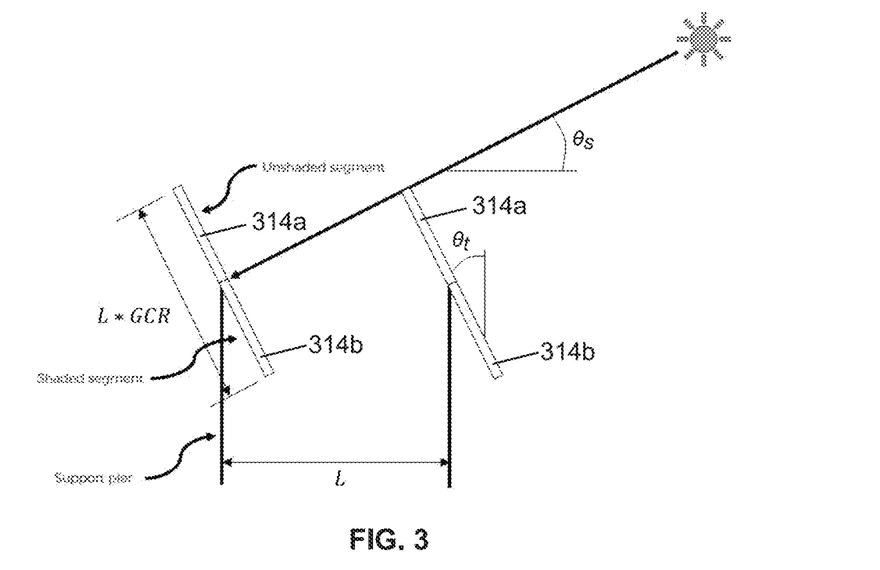
FIG. 3 is a block diagram illustrating the tracking angles and measurements pertaining to a split-cell or multi-panel backtracking system according to an aspect of the disclosure.

FIG. 3 illustrates a backtracking system including a single-axis solar tracker equipped with split-cell or multi-panel solar arrays 314a, 314b, which may be arranged in portrait and/or landscape solar arrays. The split-cell solar arrays 314a, 314b may be formed by cutting a standard solar cell into two halves 314a, 314b and bus-barring them together. When the split-cell solar module is unshaded, the current splits to flow around the two halves 314a, 314b of the split-cell solar module and then, before flowing out of the split-cell solar module, the current from the two halves 314a, 314b is combined.

The split-cell or multi-panel solar arrays 314a, 315b are capable of operating in such a manner that allows for shading of a portion of solar modules during backtracking conditions. For example, solar module segment 314a, which may be one half of a split-cell module or a panel of a multi-panel module, is unshaded, while solar module segment 314b, which may be the other half of the split-cell module or another panel of the multi-panel module, is shaded. The backtracking operation for a split-cell or multi-panel solar array may be described by a suitable sun elevation angle to solar tracker angle relationship. For example, the backtracking operation for a split-cell or multi-panel solar array may be described by the following relationship:

$$\theta_t = 2\tan^{-1}\left(\frac{\tan(\theta_S) - \sqrt{1 - 4\left(\frac{1}{GCR}\right)^2 + \tan^2(\theta_S)}}{\frac{2}{GCR} + 1}\right)$$

where $\theta_s$ is the sun elevation angle relative to the horizon, $\theta_t$ is the solar tracker angle relative to the zenith, and GCR is the ground coverage ratio.

In other aspects, where the terrain on which the backtracking system is installed is non-horizontal or otherwise irregularly shaped so that adjacent rows of solar arrays are at different heights, the sun elevation angle to tracking angle relationship may be described as:

$$\theta_t = 2\tan^{-1}\left(\frac{-\left(\sqrt{(4\Delta h^2 + 4\Delta h + 1)\tan^2(\theta_S) - \frac{4}{GCR^2} + 1}\right) + (2\Delta h + 1)\tan(\theta_S)}{\frac{2}{GCR} + 1}\right)$$

where $\theta_s$ is the sun elevation angle relative to the horizon, $\theta_t$ is the solar tracker angle relative to the zenith, GCR is the ground coverage ratio, and $\Delta h$ is the difference in height between adjacent piers 112.

Electrical separation between segments of a split-cell module or between panels in multi-panel arrays allows for increased power generation from unshaded panels and/or segments via decreased angle of incidence by operating at backtracking angles that shade a portion of the panels within the array. In contrast, traditional systems operate at angles of incidence to avoid inter-panel shading.

The backtracking system of the disclosure may actively adjust the sun elevation angle to solar tracking angle relationship to account for variations in GCR and automatically switch back to traditional backtracking if the controller 118 determines that by doing so the total power generation may be increased. This may be conducted, e.g., autonomously, based on a method illustrated in the flow diagram of FIG. 4.

Figure 4:
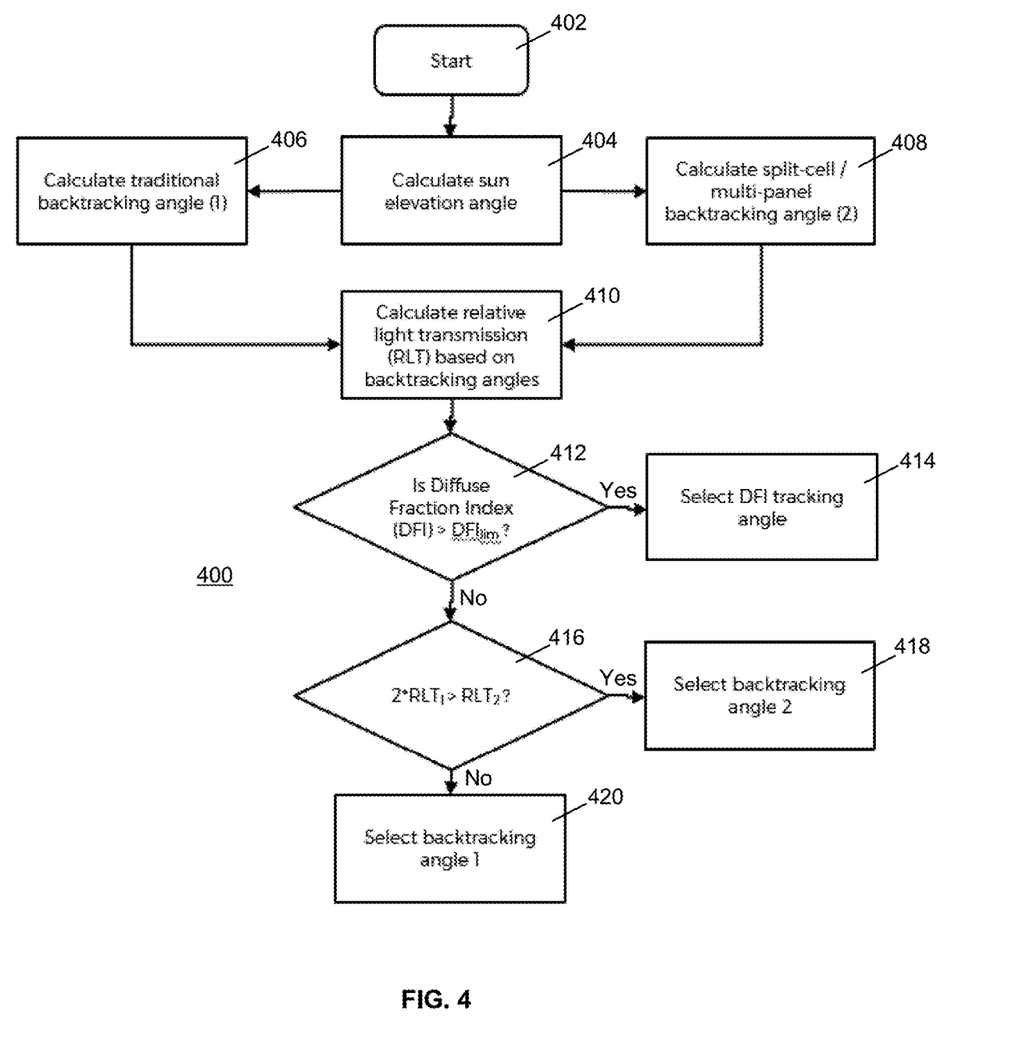
FIG. 4 depicts a flow diagram of a method of controlling a backtracking system according to aspects of the disclosure.

After starting at block 402, the sun elevation angle is calculated at block 404. Then, a traditional single-cell or single-panel backtracking angle is calculated at block 406 and a split-cell or multi-panel backtracking angle is calculated at block 408. Blocks 406 and 408 may be performed simultaneously or in parallel as illustrated in FIG. 4. Alternatively, blocks 406 and 408 may be performed in sequence. For example, block 406 may be performed first and block 408 may be performed second or vice versa.

At block 410, a traditional relative light transmission (RLT) is calculated based on the traditional backtracking angle and a split-cell or multi-panel RLT is calculated based on the split-cell/multi-panel backtracking angle. The traditional RLT and the split-cell or multi-panel RLT may be calculated based one or more suitable models. For example, the traditional RLT and the split-cell or multi-panel RLT may be calculated based on the IEC 61853-2 standard model, the theoretical air/glass interface model, and/or the empirical model developed by the Sandia National Laboratories for glass superstrate PV modules, as described, for example, in "Validation of IEC 61853-2 standard (Draft): Angle of incidence effect on photovoltaic modules," published in the 2013 IEEE 39th Photovoltaic Specialists Conference (PVSC) (16-21 Jun. 2013), the entire contents of which are incorporated herein by reference.

Additionally or alternatively, the traditional RLT and the split-cell or multi-panel RLT may be calculated according to the method described, for example, in "Calculation of the PV modules angular losses under field conditions by means of an analytical model," Solar Energy Materials & Solar Cells 70 (2001) 25-38, the entire contents of which are incorporated by reference herein. In this example method, the RLT is based on the following angular factor, $f_{1\alpha}$. The experimental value of such a parameter can be obtained by dividing the short-circuit current ($I_{sc}$) at an angle $\alpha$ by the product of the short-circuit current at normal incidence ($\alpha=0$) and the cosine of the angle $\alpha$:

$$f_{1\alpha} = \frac{I_{sc}(\alpha)}{I_{sc}(0)} \frac{1}{\cos\alpha} \cong \frac{1-\bar{R}(\alpha)}{1-\bar{R}(0)}$$

For crystalline (x-Si) and amorphous silicon (a-Si) technologies, with or without antireflective coatings, the reflectance $\bar{R}(\alpha)$ of a PV module may be calculated according to the following expression:

$$\bar{R}(\alpha) = \bar{R}(0) + [1 - \bar{R}(0)]\left[\frac{\exp(-\cos\alpha/a_r) - \exp(-1/a_r)}{1 - \exp(-1/a_r)}\right],$$

where $\alpha$ is the irradiance angle of incidence and $\alpha_r$ the angular losses coefficient, an empirical dimensionless parameter to fit in a particular case.

At block 412, a diffuse fraction index (DFI) is determined and the method determines whether the DFI is greater than a DFI limit. The DFI may be calculated according to the equation DFI=1−(DNI/GHI), where the direct normal irradiance (DNI) and the global horizontal irradiance (GHI) are directly measured using a pyranometer. Alternatively, the GHI may be measured and a model may be used to estimate the DFI. In response to determining that the DFI is greater than a DFI limit, a DFI tracking angle is selected as the angle to which the solar module is driven by the motor of the solar tracker at block 414 and the method 400 ends. Exceeding the DFI limit may result in the panels becoming more horizontal.

In response to determining that the DFI is not greater than a DFI limit at block 412, the method 400 includes determining whether twice the single-cell or single-panel RLT is greater than the split-cell or multi-panel RLT at block 416. In response to determining that twice the single-cell or single-panel RLT is greater than the split-cell or multi-panel RLT at block 416, the split-cell or multi-panel backtracking angle is selected at block 418 as the angle to which the solar module is driven by the motor of the solar tracker and the method 400 ends. On the other hand, in response to determining that twice the single-cell or single-panel RLT is not greater than the split-cell or multi-panel RLT, the single-cell or single-panel backtracking angle is selected at block 420 as the angle to which the solar module is driven by the motor of the solar tracker and the method 400 ends.

Figure 5A:
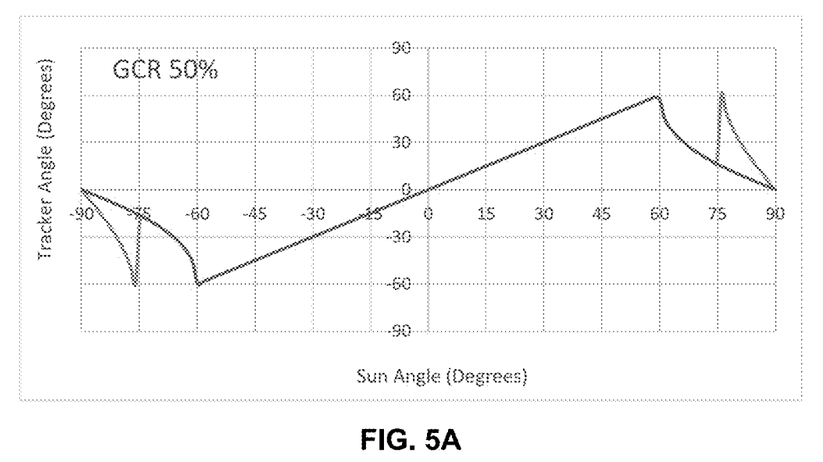
FIGS. 5A and 5B illustrate examples of tracking trajectories according to aspects of the disclosure.
Figure 5B:
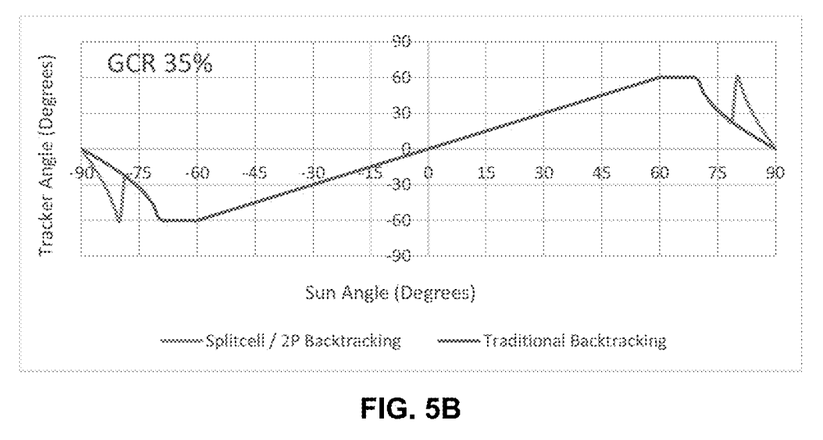

Examples of resulting tracking profiles or tracker angles with respect to the sun elevation angle are shown in FIGS. 5A and 5B. FIG. 5A illustrates the tracker angles for split-cell or two-panel backtracking and for single-cell or single-panel backtracking (traditional backtracking) for a ground clearance ratio (GCR) of 50%. For sun elevation angles between 75 degrees and 90 degrees, the tracker angle for split-cell or two-panel backtracking quickly rises from 15 degrees to 60 degrees and then falls to 0 degrees at approximately a constant rate for sun elevation angles between 75 degrees and 90 degrees. For sun elevation angles between 0 degrees and 60 degrees, the tracker angle for single-cell or single-panel backtracking rises from 0 degrees to 60 degrees. Then, for sun elevation angles between 60 degrees and 90 degrees, the tracker angle for single-cell or single-panel backtracking falls back to 0 degrees. In some aspects, at typical GCRs and latitudes, the split-cell backtracking may turn off when the sun elevation angle is at approximately 75 degrees. In other aspects, the split-cell backtracking may turn off when the sun elevation angle is at approximately 70 degrees.

FIG. 5B illustrates the tracker angles for split-cell or two-panel backtracking and for single-cell or single-panel backtracking (traditional backtracking) for a GCR of 35%. For sun elevation angles between about 78 degrees and 90 degrees, the tracker angle for split-cell or two-panel backtracking quickly rises from about 25 degrees to 60 degrees and then falls to 0 degrees at approximately a constant rate for most the sun elevation angles between about 78 degrees and 90 degrees. For sun elevation angles between 0 degrees and 60 degrees, the tracker angle for single-cell or single-panel backtracking rises from 0 degrees to 60 degrees and then plateaus until the sun elevation reaches about 70 degrees. And then for sun elevation angles between about 70 degrees and 90 degrees, the tracker angle for single-cell or single-panel backtracking falls back to 0 degrees.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects.

The invention claimed is:

1. A method of controlling a single-axis solar tracker comprising:
    determining a sun elevation angle;
    determining a single-cell or single panel solar array backtracking angle based on the sun elevation angle;

determining a split-cell or multi-panel solar array backtracking angle based on the sun elevation angle;
determining a first relative light transmission (RLT) based on the single-cell or single panel solar array backtracking angle;
determining a second RLT based on the split-cell or multi-panel solar array backtracking angle;
determining that the first RLT and the second RLT satisfy a predetermined relationship; and
in response to determining that the first RLT and the second RLT satisfy the predetermined relationship, controlling the single-axis solar tracker to rotate the solar array to the split-cell or multi-panel solar array backtracking angle.

2. The method of claim 1, further comprising:
determining that the first RLT and the second RLT do not satisfy a predetermined relationship; and
in response to determining that the first RLT and the second RLT do not satisfy the predetermined relationship, controlling the single-axis solar tracker to rotate the solar array to the single-cell or single-panel solar array backtracking angle.

3. The method of claim 1, wherein the predetermined relationship is that twice the first RLT is greater than the second RLT.

4. The method of claim 1, further comprising:
determining a diffuse fraction index (DFI);
determining that the DFI is greater than a DFI limit; and
in response to determining that the DFI is greater than a DFI limit, controlling the single-axis solar tracker to rotate the solar array to the DFI backtracking angle instead of the split-cell or multi-panel backtracking angle.

5. The method of claim 1, wherein determining a single-cell or single panel solar array backtracking angle includes evaluating the following expression:

$$\theta_t = \theta_S - \cos^{-1}\left(\frac{\cos(\theta_S)}{GCR}\right)$$

where $\theta_S$ is the sun elevation angle relative to the horizon, $\theta_t$ is the backtracking angle relative to the zenith, and GCR is a ground coverage ratio.

6. The method of claim 1, wherein determining a split-cell or multi-panel solar array backtracking angle includes evaluating the following expression:

$$\theta_t = 2\tan^{-1}\left(\frac{\tan(\theta_S) - \sqrt{1 - 4\left(\frac{1}{GCR}\right)^2 + \tan^2(\theta_S)}}{\frac{2}{GCR} + 1}\right)$$

where $\theta_S$ is the sun elevation angle relative to the horizon, $\theta_t$ is the backtracking angle relative to the zenith, and GCR is a ground coverage ratio.

7. The method of claim 6, wherein the GCR is a span or width of the solar array divided by the pier-to-pier distance between rows of piers.

8. A solar tracker system, comprising:
a first solar array including a first segment and a second segment, the first solar array rotatably coupled to a first support pier and a first motor for driving the rotation of the first solar array;
a second solar array including a first segment and a second segment, the second solar array rotatably coupled to a second support pier and a second motor for driving the rotation of the second solar array;
a controller coupled to the first motor and the second motor, the controller configured to:
determine a sun elevation angle;
determine a single-cell or single panel solar array backtracking angle based on the sun elevation angle;
determine a split-cell or multi-panel solar array backtracking angle based on the sun elevation angle;
determine a first relative light transmission (RLT) based on the single-cell or single panel solar array backtracking angle;
determine a second RLT based on the split-cell or multi-panel solar array backtracking angle;
determine that the first RLT and the second RLT satisfy a predetermined relationship; and
in response to determining that the first RLT and the second RLT satisfy the predetermined relationship, control the first motor to rotate the first solar array to the split-cell or multi-panel solar array backtracking angle.

9. The solar tracker system of claim 8, wherein the controller is further configured to:
determine that the first RLT and the second RLT do not satisfy a predetermined relationship; and
in response to determining that the first RLT and the second RLT do not satisfy the predetermined relationship, control the first motor to rotate the first solar array to the single-cell or single-panel solar array backtracking angle.

10. The solar tracker system of claim 8, wherein the predetermined relationship is that twice the first RLT is greater than the second RLT.

11. The solar tracker system of claim 8, wherein the controller is further configured to: determine a diffuse fraction index (DFI);
determine that the DFI is greater than a DFI limit; and
in response to determining that the DFI is greater than a DFI limit, control the first motor to rotate the first solar array to a DFI tracking angle.

12. The solar tracker system of claim 8, wherein determining a single-cell or single panel solar array backtracking angle includes evaluating the following expression:

$$\theta_t = \theta_S - \cos^{-1}\left(\frac{\cos(\theta_S)}{GCR}\right)$$

where $\theta_S$ is the sun elevation angle relative to the horizon, $\theta_t$ is the backtracking angle relative to the zenith, and GCR is a ground coverage ratio.

13. The solar tracker system of claim 8, wherein determining a split-cell or multi-panel solar array backtracking angle includes evaluating the following expression:

$$\theta_t = 2\tan^{-1}\left(\frac{\tan(\theta_S) - \sqrt{1 - 4\left(\frac{1}{GCR}\right)^2 + \tan^2(\theta_S)}}{\frac{2}{GCR} + 1}\right)$$

where $\theta_S$ is the sun elevation angle relative to the horizon, $\theta_t$ is the backtracking angle relative to the zenith, and GCR is a ground coverage ratio.

14. The solar tracker system of claim 13, wherein the GCR is the span of the first solar array divided by a distance between the first support pier and the second support pier.

15. The solar tracker system of claim 8, wherein the first solar array is a split-cell solar array, a multi-panel-in-landscape solar array, or a multi-panel-in-portrait solar array.

* * * * *